United States Patent [19]

Ross et al.

[11] 4,071,949
[45] Feb. 7, 1978

[54] APPARATUS FUR SECURIN A SPHERICAL BODY TO A SUPPORTING MEMBER

[75] Inventors: Cecil Jack Ross; John Fred Thompson, both of El Paso, Tex.

[73] Assignee: W. R. Weaver, El Paso, Tex.

[21] Appl. No.: 748,792

[22] Filed: Dec. 9, 1976

[51] Int. Cl.² .................................... B23Q 7/10
[52] U.S. Cl. ..................... 29/818; 29/432.2; 29/283.5; 29/505; 29/509; 29/798
[58] Field of Search .............. 29/505, 509, 432, 432.1, 29/432.2, 798, 818, 796, 283.5

[56] References Cited

U.S. PATENT DOCUMENTS

| | | | |
|---|---|---|---|
| 2,622,271 | 12/1952 | Gent et al. | 29/505 |
| 2,622,272 | 12/1952 | Haring et al. | 264/249 |
| 2,975,822 | 3/1961 | Gent et al. | 29/505 |
| 2,997,778 | 8/1961 | Barkley | 29/818 X |
| 2,998,635 | 9/1961 | Burritt, Jr. et al. | 29/509 |
| 3,952,395 | 4/1976 | Crossman et al. | 29/509 X |

*Primary Examiner*—Victor A. DiPalma
*Attorney, Agent, or Firm*—William W. Jones; Paul J. Lerner

[57] ABSTRACT

A method and apparatus for securing spherical bodies to a supporting member by staking. The spheres are fed one by one into a bore of a setting apparatus where they are picked up by the front end of a staking punch which reciprocates in the bore. The punch advances the sphere to the supporting member and imbeds the sphere in the surface of the supporting member while at the same time forming integral tangs from the supporting member which partially encircle the sphere and hold it in place. The punch then withdraws to pick up a fresh sphere and a new supporting member is moved into place to receive the fresh sphere.

2 Claims, 7 Drawing Figures

APPARATUS FUR SECURIN A SPHERICAL BODY TO A SUPPORTING MEMBER

This invention relates to a method and apparatus for securing spherical bodies to supporting surfaces. In particular, a technique for staking spheres to the erector tube part of an optical gun sight is disclosed. The invention disclosed herein is related to the subject of our copending application Ser. No. 736,661, filed Oct. 29, 1976.

It has been found that one can produce an improved mechanism for making windage and elevation adjustments in the line of sight of an optical gunsight by establishing point contact between the adjustment screws and the internal sight member which is being shifted, the latter preferably being an erector lens tube. The bearing ends of the screws are flat planar surfaces, thus the point contact with the erector lens tube is established by securing a high hardness polished steel ball to the outer surface of the tube wherever the screws would contact the tube. The same provision may be made for establishing point contact between the adjustment springs and the tube. The securement between the spheres and tube is accomplished, according to this invention, by forcibly embedding the spheres in the outer surface of the tube and staking the embedded spheres in place. The spheres are thus held securely and immovably in place in the tube. They project above a projection of the curved outer surface of the tube to be engageable with the bearing ends of the screws and springs.

The staking of the spheres can be accomplished in a semi or fully automated manner with the apparatus and method of this invention. In accordance with this invention, the supporting member, in this case, the erector lens tube, is mounted in a fixture and positioned so that the spheres will be embedded in the proper positions therein. A large quantity of spheres is stored in a hopper and fed therefrom through conduits to the requisite number of embedding and staking assemblies. A staking punch is reciprocally positioned in each staking assembly and picks up one ball at a time. The staking punch reciprocates in the assembly and, after the ball is picked up, the punch slides toward the erector tube and forcibly embeds the ball in the outer surface of the tube, at the same time deforming the tube at the point of embedment. Concurrently with the act of embedment, the punch cuts and forms a pair of tangs on the tube which are bent over to snugly embrace the ball. Thus the ball is firmly secured to the tube. The punch then withdraws to its starting position where it picks up a fresh ball while, at the same time, the finished tube is removed and replaced by a fresh tube. The process then repeats itself. The punch and tube removal apparatus are automatically controlled by a hydraulic or pneumatic cylinder, or other cyclic actuating mechanism.

It is, therefore, an object of this invention to provide a method and apparatus for securing spherical bodies or balls to a supporting surface.

It is another object of this invention to provide a method and apparatus of the character described wherein the securement is achieved by embedment and staking of the balls to the supporting surface.

It is a further object of this invention to provide a method and apparatus of the character described wherein full or semi-automation of the securement can be achieved.

These and other objects and advantages of the invention will become more readily apparent from the following detailed description of a preferred embodiment of the invention taken in conjunction with the accompanying drawings, in which.

Figure 5:
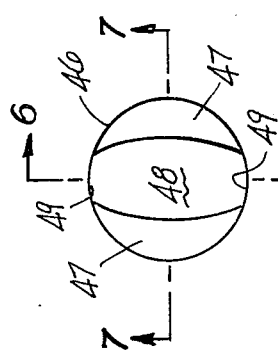
Figure 6:
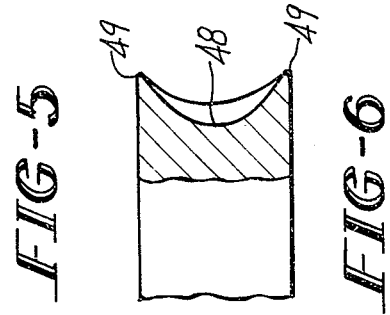
Figure 7:
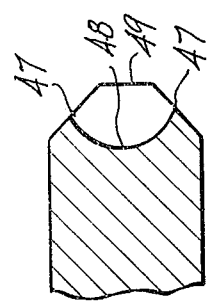

FIG. 5 is an end elevational view of the embedding and staking end of the punch; and FIGS. 6 and 7 are axial sectional views of the punch taken along lines 6—6 and 7—7 respectively of FIG. 5.

Figure 1:
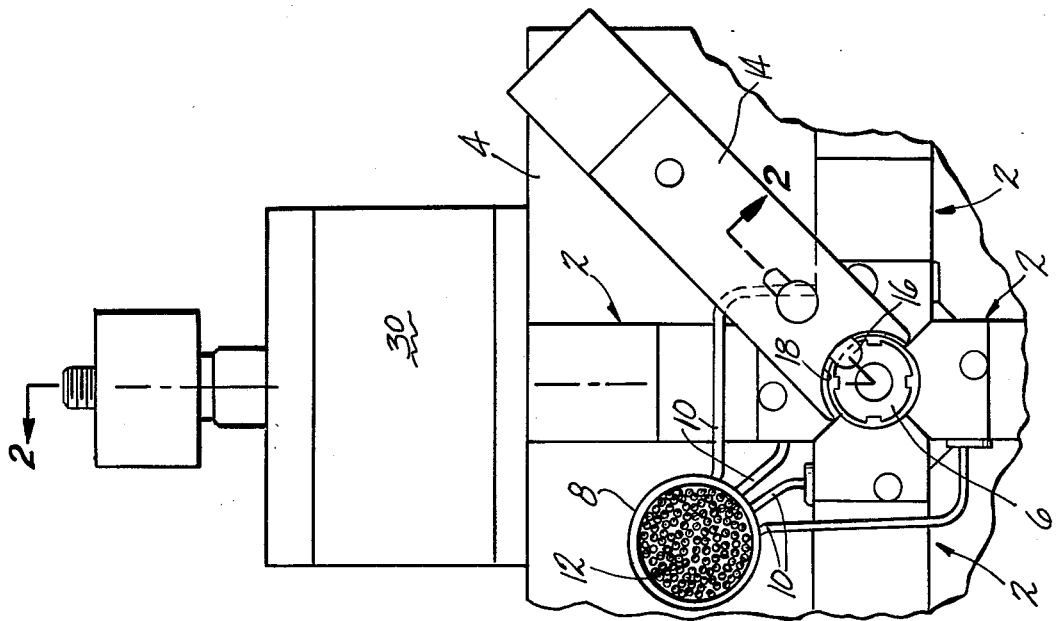
FIG. 1 is a fragmented top plan view of an apparatus formed in accordance with this invention.

Referring now to the drawings, FIG. 1 shows a portion of an apparatus according to this invention. The apparatus includes an appropriate number of staking assemblies denoted generally by the number 2 depending upon the number of balls to be secured to the supporting member. In the specific embodiment shown there are four such staking assemblies, all of which are similar in construction. The assemblies 2 are mounted on a table 4 and equi-angularly disposed about a mandrel 6 supported by the table 2. A hopper 8 is mounted on the table 2 and attached thereto are a plurality of feed conduits 10 which lead from the hopper 8 to each staking assembly 2. The hopper 8 contains a plurality of small steel balls 12 which are automatically fed therefrom by gravity through the conduits 10 to the staking assemblies 2. A bridge 14 is mounted on the table 2 and includes a projecting lug 16 disposed above the mandrel 6 and used to locate the article into which the balls are to be embedded. The specific article that the disclosed device is designed to operate on is an erector tube for an optical gun-sight, thus the end surface 18 of the bridge 14 is concavely arcuate so as to snugly engage the outer surface of the erector tube.

Figure 2:
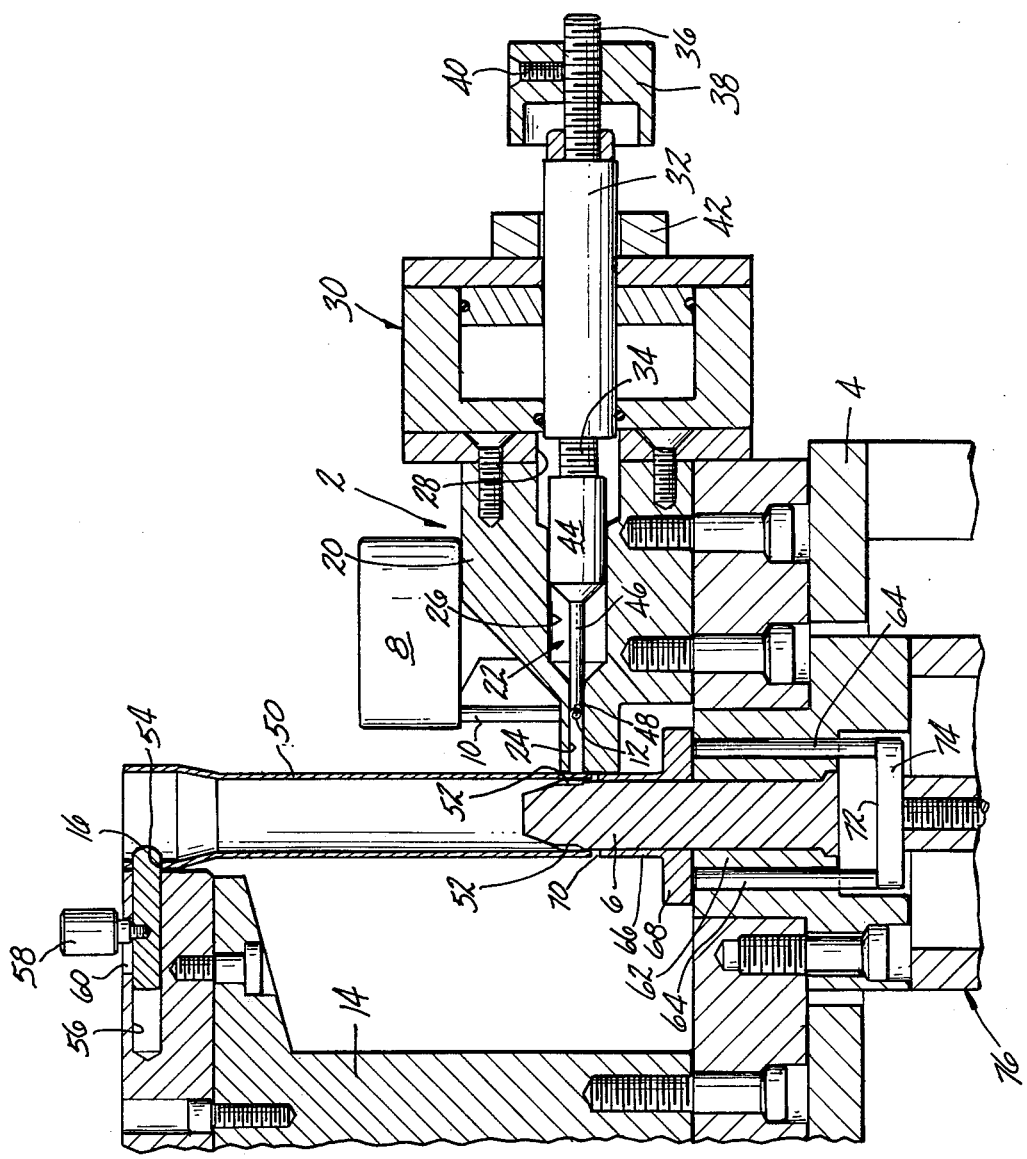
FIG. 2 is a sectional view of the apparatus taken along line 2—2 of FIG. 1 and showing an erector tube mounted in place.

Referring now to FIG. 2, the construction of a staking assembly 2 is shown. The assembly 2 includes housing 20 having a compound bore 22. The bore 22 includes a first portion 24 of reduced diameter which opens out adjacent to the mandrel 6, an intermediate portion 26 of somewhat enlarged diameter, and an outer portion 28. Mounted on the housing 20 is a pneumatic actuator 30. A Mack "LO-PRO" (T.M.) air cylinder #802-8 has been found to be an acceptable pneumatic actuator. The actuator 30 operates a piston 32 which includes an inner threaded extension 34 and an outer threaded extension 36. A collar 38 is screwed onto the outer extension 36 and locked in place by a set screw 40. The collar 38 will abut a washer 42 mounted on the actuator 30 to control the stroke length of the piston 32, which is, therefore, adjustable. A staking punch member 44 is screwed onto the inner extension 34. The punch member 44 includes a forward portion 46 of reduced diameter which is slidably movable within the smaller diameter bore 24. The forward end 48 of the punch member 44 is generally concave in configuration and its functions will be set forth in greater detail hereinafter. It will be understood that the piston 32 and staking punch 44 are reciprocable between a withdrawn position, shown in FIG. 2 wherein a ball 12 is picked up by the punch 44, and an extended position (see FIG. 4) wherein the ball 12 is embedded and staked into the workpiece.

Referring still to FIG. 2, it will be noted that a workpiece in the form of an erector lens tube 50 is shown telescoped over and mounted on the mandrel 6. It will also be noted that the mandrel 6 is provided with four external axial grooves 52 which are positioned inwardly of the locations on the workpiece where the balls are to be embedded. The lug 16 mounted on the bridge 14 extends into an opening 54 in the workpiece which serves to properly orient the workpiece for placement of the balls. It will be noted that the lug 16 is slidably mounted in a bore 56 in the bridge and a locking screw 58 engages the lug 16 while extending through a slot 60 which opens into the bore 56. Thus the lug 16 can be locked in place by tightening the screw 58 down against the sides of the slot 60. Conversely, the lug 16 can be withdrawn from the workpiece opening 54 by loosening the screw 58 and pulling it and the lug 16 away from the workpiece 50.

It will be noted that the mandrel 6 is mounted in a bearing ring 62 and thus secured to the table 4. Ejector pins 64 project through holes of bearing ring 62. Seated on the top of the table 4 and surrounding the mandrel 6 is an ejection collar 66. The collar 66 has a base 68 which overlies the top ends of the ejector pins 64. The collar 66 is slidable over the mandrel 6 and includes an upper end surface 70 which is adjacent to the lower end surface of the workpiece 50. The ejector pins 64 are seated on the upper surface 72 of a reciprocating ram 74 which is operated by a pneumatic actuator 76. A Mack "PENNI-ROYAL" (T.M.) air cylinder #1598-4 has been found suitable for use as the actuator 76. After the balls have been set in the workpiece 50, the lug 16 is withdrawn from the opening 54 and the ram 74 is raised by the actuator 76. This causes the ejector pins 64 and ejector collar 66 to be lifted in such a way that the ejector collar 66 pushes the workpiece 50 off of the mandrel 6. The ram 74 is then returned to its original position by the actuator 76 and the ejector pins 64 and ejector collar 66 also return to their original positions. A new workpiece is then positioned on the mandrel for a subsequent setting operation.

Figure 3:
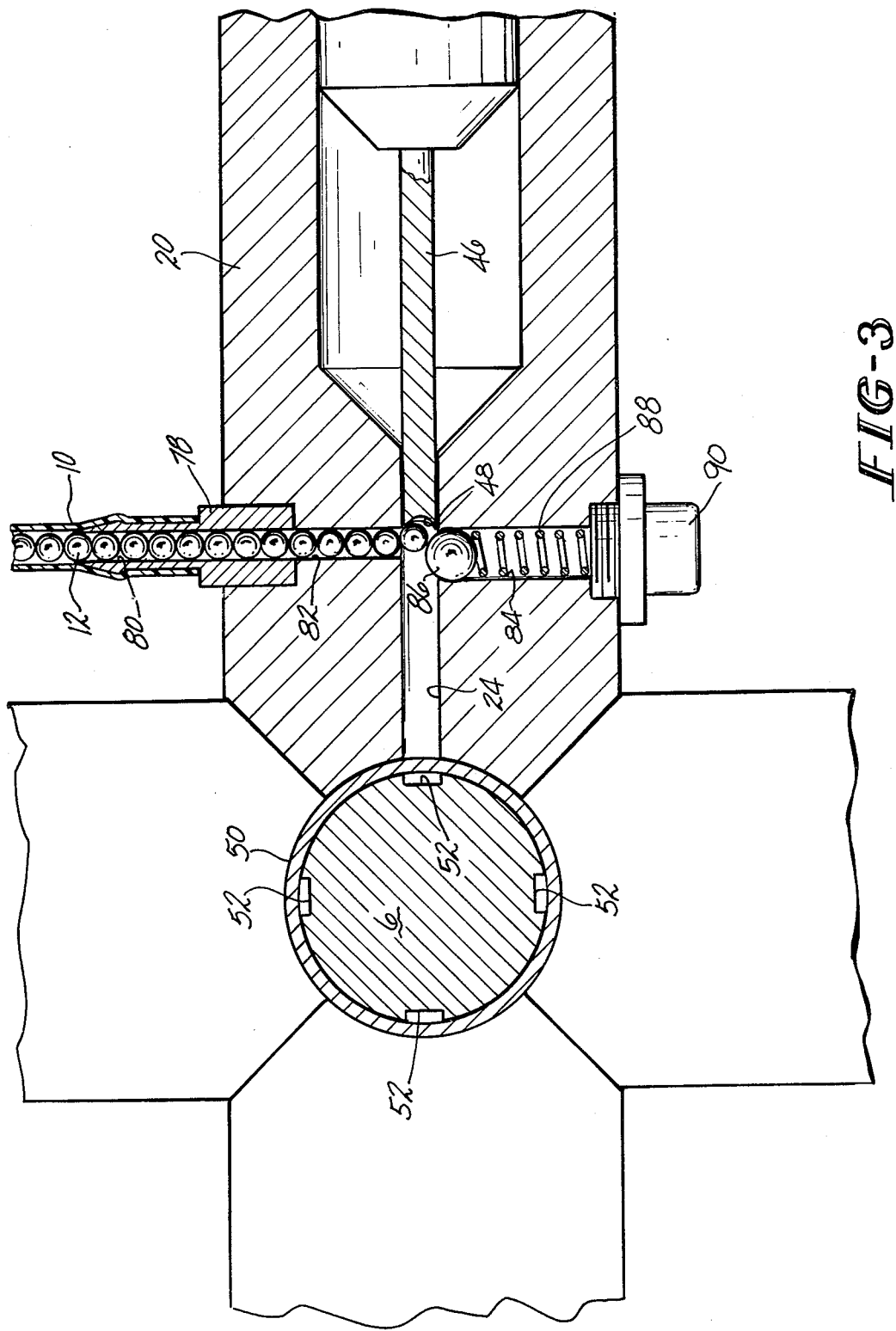
FIG. 3 is a fragmented top plan view of the apparatus with one of the embedment and staking assemblies being shown in sectional view.

Referring now to FIG. 3, the manner in which the balls 12 are fed into the housing 20 is disclosed. As previously noted, the balls 12 pass from the hopper 8 into a number of conduits 10 each of which goes to one of the embedding and staking assemblies. The conduit 10 is made of a plastic material such as polytetrafluorethylene, known by the trademark Teflon, and is fitted onto a nipple 78 secured to the housing 20. The nipple 78 has a through bore 80 which opens into a bore 82 which in turn communicates with the staking punch bore 24. Thus the balls pass through the conduit 10, the nipple bore 80, and the housing bore 82 so as to be continuously fed into the staking punch bore 24. The housing 20 is provided with a passage 84 which is diametrically opposite the ball-feeding bore 82 and which opens into the staking punch bore 24. A detent ball 86 is seated in the passage 84 and is biased by a spring 88 so as the retractably protrude into the staking punch bore 24. The spring 88 is seated on a closure cap 90. It will be noted from FIG. 3 that the detent ball 86 combines with the front surface 48 of the staking punch 46 to allow only a single ball 12 to enter the staking punch bore 24. In FIG. 3 the punch 46 is shown in its retracted position wherein it is disposed to pick up the end-most ball in the column thereof on its front face 48. The punch 46 is then moved through its work stroke and advanced to the position shown in FIG. 4 wherein it is shown embedding and staking the ball 12 into the outer surface of the erector tube 50. It will be appreciated that as the punch 46 advances through the bore 24, it pushes the ball 12 ahead of it and it also cams aside the detent ball 86. Finally, it prevents a new ball 12 from passing from the bore 82 into the bore 24 until it is returned to its retracted position.

Figure 4:
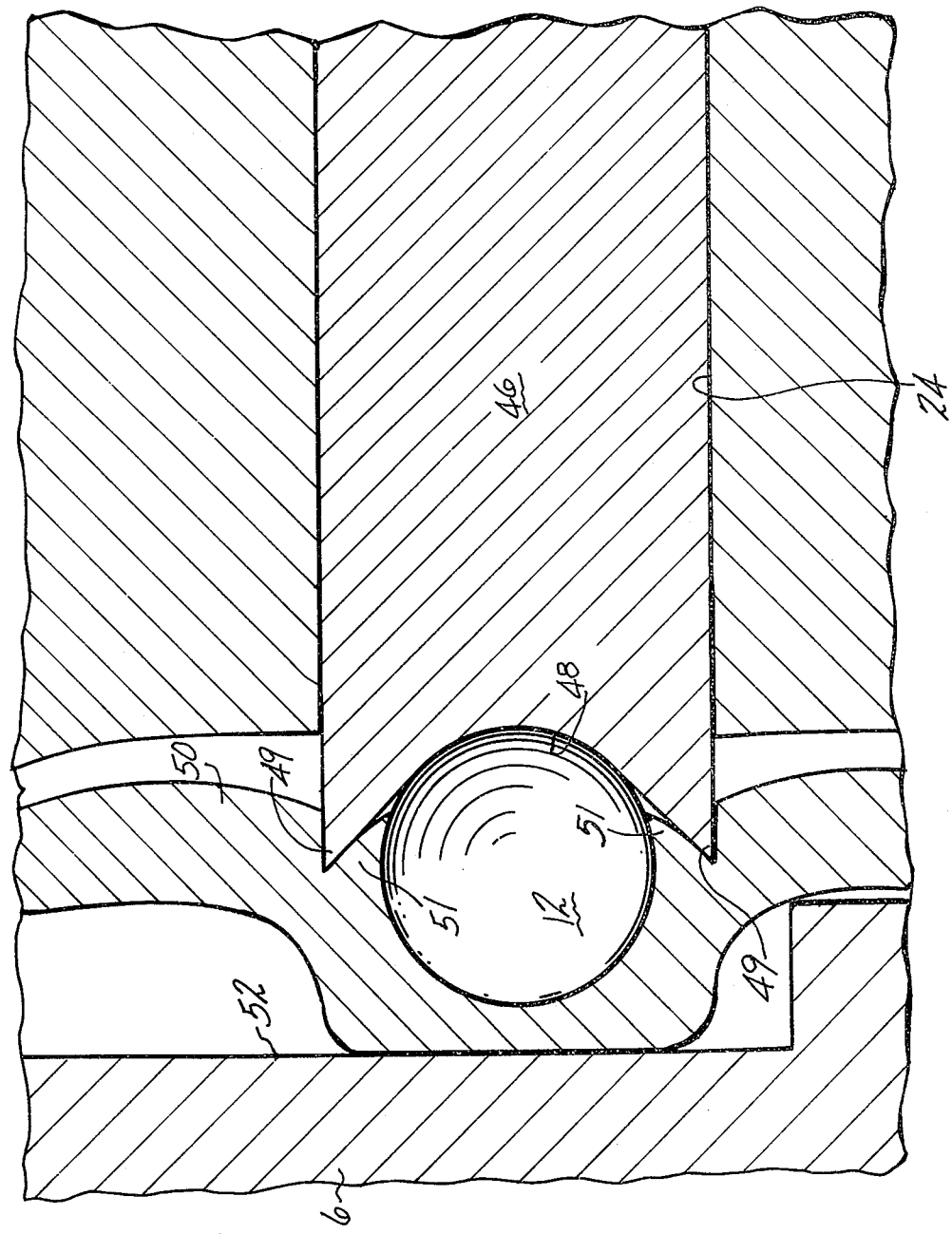
FIG. 4 is a horizontal sectional view of the staking punch showing the latter embedding and staking a ball in the erector tube surface.

Referring now to FIG. 4, the staking punch 46 is shown in its working position wherein it is securing a ball 12 to the outer surface of the erector tube 50. It will be understood that as the ball 12 is pushed toward and contacts the outer surface of the erector tube 50, the ball 12 will center itself in the working face concavity 48 of the punch 46 before the embedment operation begins. Once contact is made with the erector tube 50 and the ball 12 is centered, the punch 46 continues advancing toward the mandrel 6 so as to deform the erector tube 50 locally and bend it back into the mandrel groove 52 as shown in FIG. 4. This deformation of the erector tube is accomplished with the ball itself which then becomes embedded in the erector tube wall. The punch 46 is formed with chisel-like front edges 49 which are diametrically opposed to each other and which cut into the material of the erector tube wall and form therein a pair of opposed tangs or tabs 51. These tabs 51 are integral with and a part of the erector tube wall and are squeezed tightly against the ball 12 by the end surface 48 of the punch 46, as shown in FIG. 4, to securely lock the ball 12 immovably in place on the erector tube outer surface. It will be noted that the surface of the secured ball 12 protrudes radially outwardly beyond a projection of the outer surface of the erector tube 50.

Referring now to FIGS. 5-7, the configuration of the end surface 48 of the punch 46 is most clearly shown. It will be noted that the projecting chisel-like sharp edges 49 are formed 180° apart from each other by providing intervening inwardly chamfered surfaces 47 at the end of the punch 46. The curvature of the end surface 48 is preset so that it can pick up and center the ball to be set in the workpiece easily before the actual embedment into the workpiece begins. This curvature also extends to the inside surfaces of the sharp edges 49 so as to ensure that the tabs 51 will be bent snugly against the ball as they are cut from the workpiece. It will be understood that the punch 46, detent ball 86 and all other parts of the apparatus subjected to excessive wear during operation will be formed from hardened steel. The balls 12 are also hardened steel.

It will be readily appreciated that the apparatus and method of this invention provide for fast and sure securement of balls or other spherical or near spherical bodies to a supporting workpiece. A high degree of automation is rendered possible by the invention.

Since many changes and variations of the disclosed embodiment of the invention may be made without departing from the inventive concept it is not intended to limit the invention otherwise than as required by the appended claims.

What is claimed is:

1. An apparatus for securing a ball to a relatively thin-walled telescopic sight erector tube, said apparatus comprising:

a. a mandrel for telescopingly receiving and supporting the erector tube during the securing operation, said mandrel having a free end over which the erector tube is moved when mounting and removing the erector tube from said mandrel, said mandrel being provided with at least one longitudinally extending groove formed in its outer surface, said groove extending to said free end of said mandrel;

b. a housing having a first bore therein which opens therefrom at a location directly opposite said mandrel groove, said housing having a second bore for receiving a stack of the balls, said second bore opening into said first bore;

c. means for feeding a succession of balls to said second bore;

d. means in said first bore for allowing only a single ball at a time to enter said first bore from said second bore;

e. moveable ball-setting means disposed in said first bore for reciprocal movement wherein a ball is picked up by said ball-setting means, advanced through said first bore and embeddedly fixed in the erector tube outer surface by said ball-setting means to an extent wherein the erector tube is locally deformed and bent inwardly into said mandrel groove; and f. actuator means for moving said moveable means through its reciprocal movement cycle.

2. The apparatus of claim 1 further comprising ejecting means around a base portion of said mandrel for engagement with an end surface of the erector tube, said ejecting means being reciprocably slidable over said mandrel to move the erector tube over said free end of said mandrel after the ball has been set therein, to eject the erector tube from said mandrel.

* * * * *

UNITED STATES PATENT OFFICE
CERTIFICATE OF CORRECTION

Patent No. 4,071,949     Dated Feb. 7, 1978

Inventor(s) Cecil Jack Ross and John Fred Thompson

It is certified that error appears in the above-identified patent and that said Letters Patent are hereby corrected as shown below:

In the title, change "FUR SECURIN" to --FOR SECURING--.

Signed and Sealed this

Fourth Day of November 1980

[SEAL]

Attest:

SIDNEY A. DIAMOND

Attesting Officer     Commissioner of Patents and Trademarks